United States Patent
Malinin et al.

(10) Patent No.: US 12,438,449 B2
(45) Date of Patent: Oct. 7, 2025

(54) POWER FACTOR CORRECTION SYSTEM, CONTROLLER AND METHOD OF CONTROLLING A POWER FACTOR CORRECTION SYSTEM

(71) Applicant: Infineon Technologies Austria AG, Villach (AT)

(72) Inventors: Andrey Malinin, Fort Collins, CO (US); Renato Bessegato, Oberhaching (DE)

(73) Assignee: Infineon Technologies Austria AG, Villach (AT)

( * ) Notice: Subject to any disclaimer, the term of this patent is extended or adjusted under 35 U.S.C. 154(b) by 342 days.

(21) Appl. No.: 18/318,082

(22) Filed: May 16, 2023

(65) Prior Publication Data
US 2024/0388198 A1    Nov. 21, 2024

(51) Int. Cl.
*H02M 1/42* (2007.01)
*H02M 1/00* (2006.01)

(52) U.S. Cl.
CPC ....... *H02M 1/4233* (2013.01); *H02M 1/0043* (2021.05); *H02M 1/4208* (2013.01); *H02M 1/4225* (2013.01)

(58) Field of Classification Search
CPC ............. H02M 1/0043; H02M 1/4208; H02M 1/4225; H02M 1/4233
See application file for complete search history.

(56) References Cited

U.S. PATENT DOCUMENTS

| | | | | |
|---|---|---|---|---|
| 11,264,908 B1* | 3/2022 | Beltran | ................ | G06F 3/015 |
| 2016/0013713 A1* | 1/2016 | Li | ................ | H02M 3/1584 |
| | | | | 323/312 |
| 2018/0269773 A1* | 9/2018 | Kaeriyama | ......... | H02M 7/5395 |
| 2020/0321872 A1* | 10/2020 | Upadhyaya | ........... | H02M 3/157 |

OTHER PUBLICATIONS

Marxgut, C., et al., "Interelieved Triangular Current Mode (TCM) Resonant Transition, Single Phase PFC Rectifier with High Efficiency and High Power Density", The 2010 International Power Electronics Conference, 2010.

* cited by examiner

*Primary Examiner* — Jue Zhang
*Assistant Examiner* — Lakaisha Jackson
(74) *Attorney, Agent, or Firm* — Murphy, Bilak & Homiller, PLLC

(57) ABSTRACT

A multi-phase PFC (power factor correction) system, controller, and method of controlling the multi-phase PFC system are described. The method includes operating the phases under variable frequency control to interleave current delivered by the plurality of phases to a load. During a switching cycle for the phases, a phase synchronization correction indicator is activated if a predetermined crossing point along a rising or falling slope of the current delivered by a second phase is misaligned with the same predetermined crossing point along the opposite slope of the current delivered by a first phase. During the next switching cycle, a switching period of the second phase is adjusted if the phase synchronization correction indicator was activated during the previous switching cycle.

20 Claims, 7 Drawing Sheets

POWER FACTOR CORRECTION SYSTEM, CONTROLLER AND METHOD OF CONTROLLING A POWER FACTOR CORRECTION SYSTEM

BACKGROUND

Many high-power applications such as telecom and data center server power supplies utilize a front-end AC-DC rectifier which contains a PFC (power factor correction) front-end stage that regulates the bus voltage to a DC value. The PFC stage shapes the input current of the power supply to be in synchronization with the mains voltage, to maximize the real power drawn from the mains. Active PFC can be achieved by several topologies, including boost converter and totem pole topologies. In the case of the boost converter topology, the input voltage to the boost is a rectified sinusoidal voltage and the average inductor current is continuously conducted through two diodes of a rectifier bridge which causes significant conduction loss, especially at higher power and low-line conditions. The totem pole PFC topology is a bridgeless circuit in that there is no rectifier diode bridge at the PFC input. Accordingly, the associated rectifier bridge losses are eliminated which leads to higher efficiency and power density.

A totem pole PFC is typically controlled in TCM (Triangular Current mode). TCM allows implementation of ZVS (Zero Volt Switching) which eliminates turn-on switching losses and enables high switching frequency applications with high efficiency. However, a drawback of TCM is very high ripple current at more than 100% of the average. High ripple current requires the addition of a large EMI (electromagnetic interference) filter with associated cost, volume and power loss which significantly offsets the benefits of a totem pole PFC.

To compensate for the high ripple current, a multiphase interleaved approach is typically used. In the case of a totem pole interleaved topology with two or more phases, a second phase (and perhaps a third phase) is conventionally always enabled which introduces additional switching power losses and reduces efficiency at light load conditions while fulfilling the current requirement at heavy (full) load. Also, due to the variable frequency nature of TCM 'interleaving' (or 'out-of-phase' operation), it is difficult to implement a totem pole interleaved topology because the phase shift for the variable frequency signals cannot be defined.

Any system for phase synchronization of two or more signals has three main components: a phase detector; a control loop filter-compensator; and a voltage controlled oscillator (VCO). Implementation of the control loop filter-compensator and VCO can be the same for fixed and variable frequency systems, which means the key component is the phase detector. Phase detector methods work very well if frequency of the signal is stable and does not vary. However, if the signal frequency is changing, a phase detection error arises that depends on the speed and direction of the frequency change. Accordingly, the phase shift feedback loop will interfere with the frequency control loop. For totem pole PFC applications in TCM configuration, frequency changes continuously and the phase control loop will interfere with the PFC current control loop, causing unnecessary current distortion.

Thus, there is a need for an improved totem pole interleaved topology which supports multiphase interleaved operation in TCM configuration.

SUMMARY

According to an embodiment of a method for controlling a PFC (power factor correction) system having a plurality of phases, the method comprises: operating the plurality of phases under variable frequency control to interleave current delivered by the plurality of phases to a load; during a switching cycle for the plurality of phases, activating a phase synchronization correction indicator if a predetermined crossing point along a rising or falling slope of the current delivered by a second phase of the plurality of phases is misaligned with the same predetermined crossing point along the opposite slope of the current delivered by a first phase of the plurality of phases; and during the next switching cycle, adjusting a switching period of the second phase if the phase synchronization correction indicator was activated during the previous switching cycle.

According to an embodiment of a controller for a PFC system having a plurality of phases, the controller comprises: a variable frequency control loop configured to operate the plurality of phases under variable frequency control to interleave current delivered by the plurality of phases to a load; and a phase correction circuit configured to: during a switching cycle for the plurality of phases, activate a phase synchronization correction indicator if a predetermined crossing point along a rising or falling slope of the current delivered by a second phase of the plurality of phases is misaligned with the same predetermined crossing point along the opposite slope of the current delivered by a first phase of the plurality of phases; and during the next switching cycle, adjust a switching period of the second phase if the phase synchronization correction indicator was activated during the previous switching cycle.

According to an embodiment of a PFC system, the PFC system comprises: a plurality of phases; and a controller configured to: operate the plurality of phases under variable frequency control to interleave current delivered by the plurality of phases to a load; during a switching cycle for the plurality of phases, activate a phase synchronization correction indicator if a predetermined crossing point along a rising or falling slope of the current delivered by a second phase of the plurality of phases is misaligned with the same predetermined crossing point along the opposite slope of the current delivered by a first phase of the plurality of phases; and during the next switching cycle, adjust a switching period of the second phase if the phase synchronization correction indicator was activated during the previous switching cycle.

Those skilled in the art will recognize additional features and advantages upon reading the following detailed description, and upon viewing the accompanying drawings.

BRIEF DESCRIPTION OF THE FIGURES

The elements of the drawings are not necessarily to scale relative to each other. Like reference numerals designate corresponding similar parts. The features of the various illustrated embodiments can be combined unless they exclude each other. Embodiments are depicted in the drawings and are detailed in the description which follows.

DETAILED DESCRIPTION

The embodiments described herein provide a PFC system, controller, and synchronisation method for a multiphase totem pole interleaved topology that uses frequency control. The embodiments described detect, adjust, and maintain synchronized out-of-phase two (or more) current phases in a totem pole interleaved PFC system controlled in a sliding current mode (or hysteretic control), where synchronization in a variable frequency environment is needed. Two or more current phases are considered out-of-phase synchronized when the crossing point of one current phase slope, identified as the applied delta current divided by the numbers of current phases, is coincident with the crossing point of another current phase of the opposite slope. For example, in the case of two phases, the two current phases are considered out-of-phase synchronized when the midpoint of the rising slope of one current phase is coincident with the midpoint of the falling slope of the other phase.

The embodiments described herein compensate the measured phase shift in a switching cycle, i.e., the misalignment of the corresponding crossing points, by extracting a phase correction parameter that is used to adjust the amount of current to be applied during the next switching cycle. The phase shift may be measured by building a signal for each current phase that indicates when the corresponding inductor current crosses the predetermined crossing point, e.g., the middle point of the current phase slope for two phases, and then measuring the distance between a qualified rising edge of one phase and the subsequent falling edge of another phase. The corresponding phase correction determined from this process is used to ensure out-of-phase synchronisation.

Described next, with reference to the figures, are exemplary embodiments of the totem pole interleaved topology and a related controller, PFC system, and method of controlling the PFC system.

Figure 1:
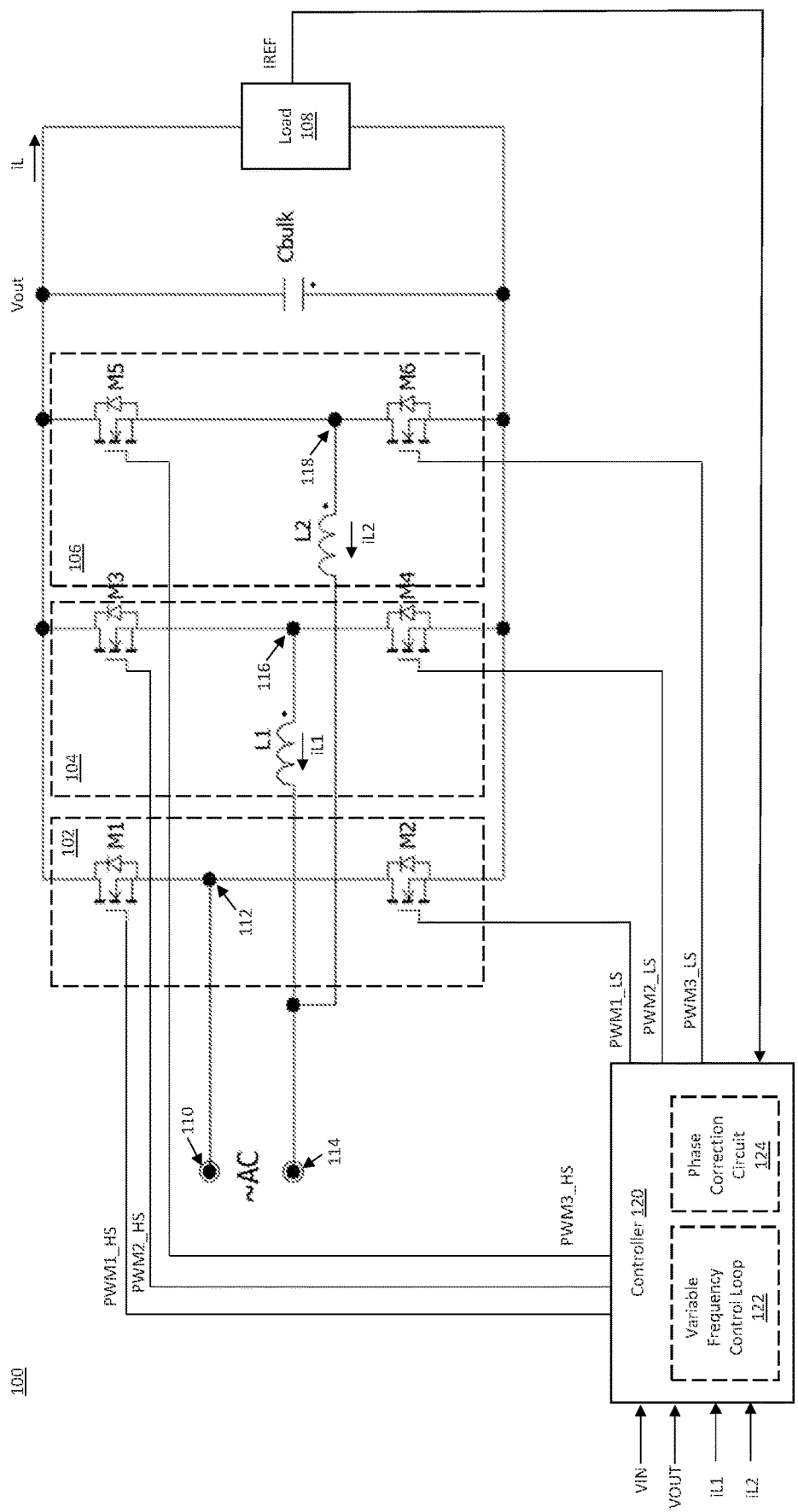
FIG. 1 illustrates a schematic diagram of an embodiment of a multi-phase PFC system.

FIG. 1 illustrates an embodiment of a PFC system 100. The PFC system 100 includes a plurality of phases 102, 104, 106 for delivering current iL to a load 108. Each phase 102, 104, 106 includes a series-connected high side (HS) switch M1, M3, M5 and low side (LS) switch M2, M4, M6 coupled in parallel with the load 108. A first terminal 110 that provides AC mains is coupled to the switching node 112 of a first (primary) phase 102 of the PFC system 100. A second terminal 114 that provides AC mains is coupled to the respective switching node 116, 118 of each additional phase 104, 106 through a corresponding inductor L1, L2. The phase switches M1 through M6 are illustrated as power MOSFETs (metal-oxide-semiconductor field-effect transistors) with a freewheeling diode. Any suitable power transistors may be used for the phase switches M1 through M6 such as but not limited to Si or SiC power MOSFETs, IGBTs (insulated gate bipolar transistors), HEMTs (high-electron mobility transistors), etc.

The primary phase 102 of the PFC system 100 is enabled for all load current conditions. Accordingly, the primary phase 102 is enabled under the complete load range. Each additional phase 104, 106 is enabled only under heavier load conditions and disabled under light load conditions. For example, a second phase 104 may be enabled when an average current reference 'IREF' indicated by the load 108 increases a level. If the PFC system 100 has more than two (2) phases 102, 104, a third phase 106 may be enabled when the average current reference IREF increases to an even higher level. Still additional phases (not shown) may be enabled for even higher average current reference levels. The phases 104, 106 of the PFC system 100 other than the primary phase 102 are also referred to herein as fast switching phases.

The switches M1, M2 of the primary phase 102 operate at line frequency for voltage rectification and therefore function as rectifiers. The switches M3, M4 of the first fast switching phase 104 operate at a PWM frequency for voltage step-up and therefore function as a boost device when the first fast switching phase 104 is enabled. The switches M5, M6 of the second fast switching 106 also operate at a PWM frequency for voltage step-up and likewise function as a boost device when the second fast switching phase 106 is enabled. Each fast switching phase 104, 106 has a respective inductor L1, L2, and a bulk capacitor Cbulk supports the boosting operation.

As the average current reference IREF drops, the previously enabled fast switching phases 104, 106 are disabled in the opposite order (third then second, in the example given above). The primary phase 102 of the PFC system 100 remains enabled even under light load conditions.

The PFC system 100 also includes a controller 120. The controller 120 includes digital circuitry such as a variable frequency control loop 122 for operating the phases 102, 104, 106 under variable frequency control via respective PWM signals PWMx_HS, PWMx_LS for the individual phase switches M1 through M6, to interleave the current iL delivered by the phases 102, 104, 106 to the load 108. The controller 120 also includes a phase correction circuit 120 for ensuring out-of-phase synchronisation of the phases 102, 104, 106.

During a positive semi-period of the input voltage AC, phase switch M1 is in the on-state and phase switch M2 is in the off-state. Upper fast switching phase switch M3 (and M5 if phase 106 is active), lower fast switching phase switch M4 (and M6 if phase 106 is active) and power inductor L1 (and L2 if phase 106 is active) form a boost DC/DC stage where phase switch M3 (and M5 if phase 106 is active) acts as a master switch and phase switch M4 (and M6 if phase 106 is active) acts as a slave switch.

During a negative semi-period of the input voltage AC, phase switch M1 is in the off-state and phase switch M2 is in the on-state. Lower fast switching phase switch M4 (and M6 if phase 106 is active), upper fast switching phase switch M3 (and M5 if phase 106 is active) and power inductor L1 (and L2 if phase 106 is active) form a boost DC/DC stage where phase switch M4 (and M6 if phase 106 is active) acts as a master switch and phase switch M3 (and M5 if phase 106 is active) acts as a slave switch.

The switching activities of the phase switches M3 and M4 of the first fast switching phase 104 and the switching activities of the phase switches M5 and M6 of the second fast switching phase 106 are controlled by the corresponding PWM signals PWMx_HS, PWMx_LS generated by the controller 120, and follow a target average current profile 'IAV'.

The controller 120 generates the PWM signals PWMx_HS, PWMx_LS for the fast switching phases 104, 106 based on the measured input voltage 'VIN', a target output voltage 'VOUT' at the load 108, the target average current profile IAV, and the measured inductor currents iL1, iL2 for the fast switching phases 104, 106. A phase correction circuit 124 extracts information to compensate for phase shift between the fast switching phases 104, 106.

Operation of the PFC system 100 is explained next in more detail with reference to FIGS. 2 through 6, for the case of two fast switching phases 104, 106 and in the context of TCM. However, the controller 120 may employ other modes of operation such as CCM (continuous conduction mode) where the inductor currents iL1, L2 do not reverse direction, or critical conduction mode where the inductor currents iL1, IL2 rise and fall but stop at zero. The operation may be readily extended to three or more fast switching phases, as explained later herein. The method illustrated in FIG. 2 may be implemented by a state machine of the controller 120, for example.

Figure 2:
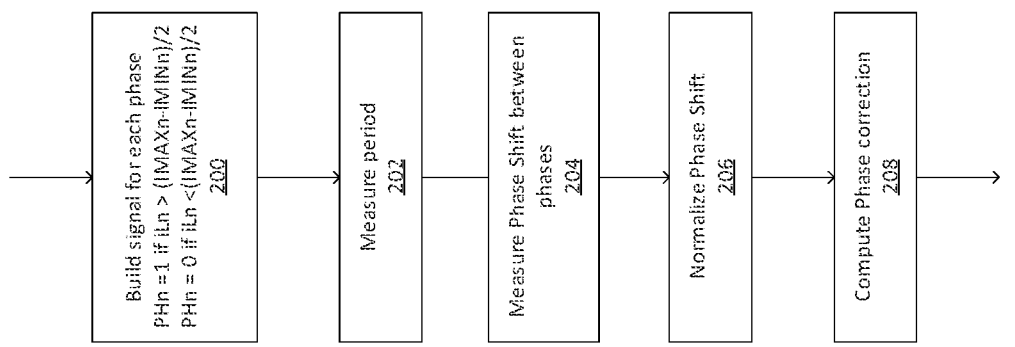
FIG. 2 illustrates a flow diagram of an embodiment of a method of controlling the multi-phase PFC system.
Figure 6:
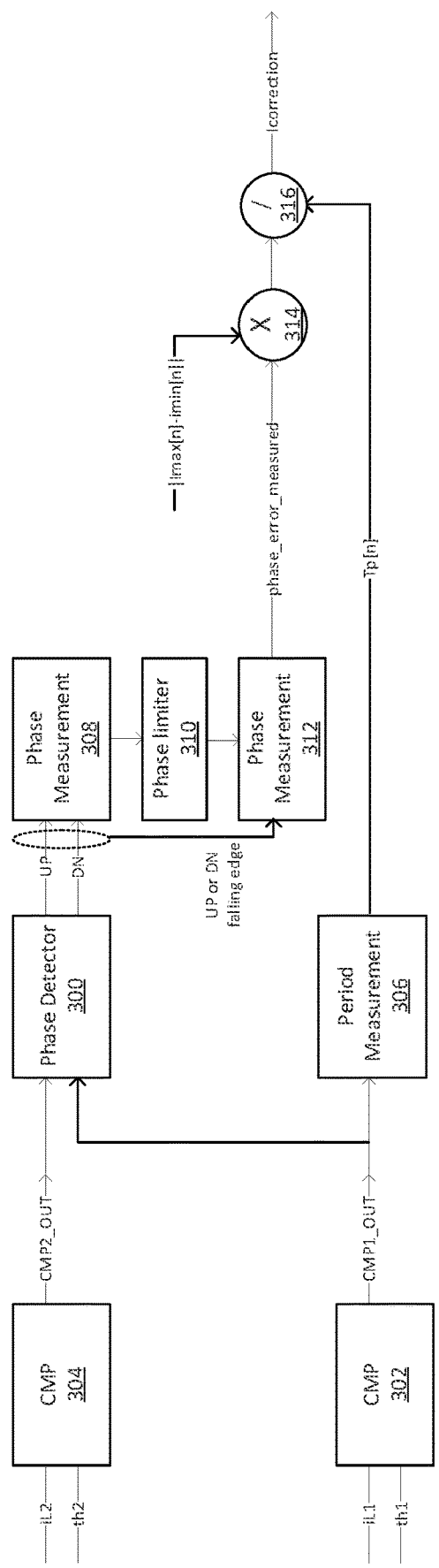
FIG. 6 illustrates a block diagram of an embodiment of a phase correction circuit for a controller of the multi-phase PFC system.

The controller 120 builds (generates) a current phase signal 'PHn' for each fast switching phase 104, 106 under consideration, where the current phase signal PHn follows the corresponding measured inductor current iLn (FIG. 2, Block 200). As shown in FIG. 6, a phase detector block 300 of the phase correction circuit 124 extracts two components 'UP', 'DN' of a phase synchronization correction indicator based on two comparator signals 'CMP1_OUT', 'CMP2_OUT' that indicate when the corresponding inductor currents iL1, IL2 cross the same predetermined crossing point 'th1', 'th2'. In the 2-phase example, the predetermined crossing point th1, th2 is the midpoint of the current phase slopes.

Figure 3:
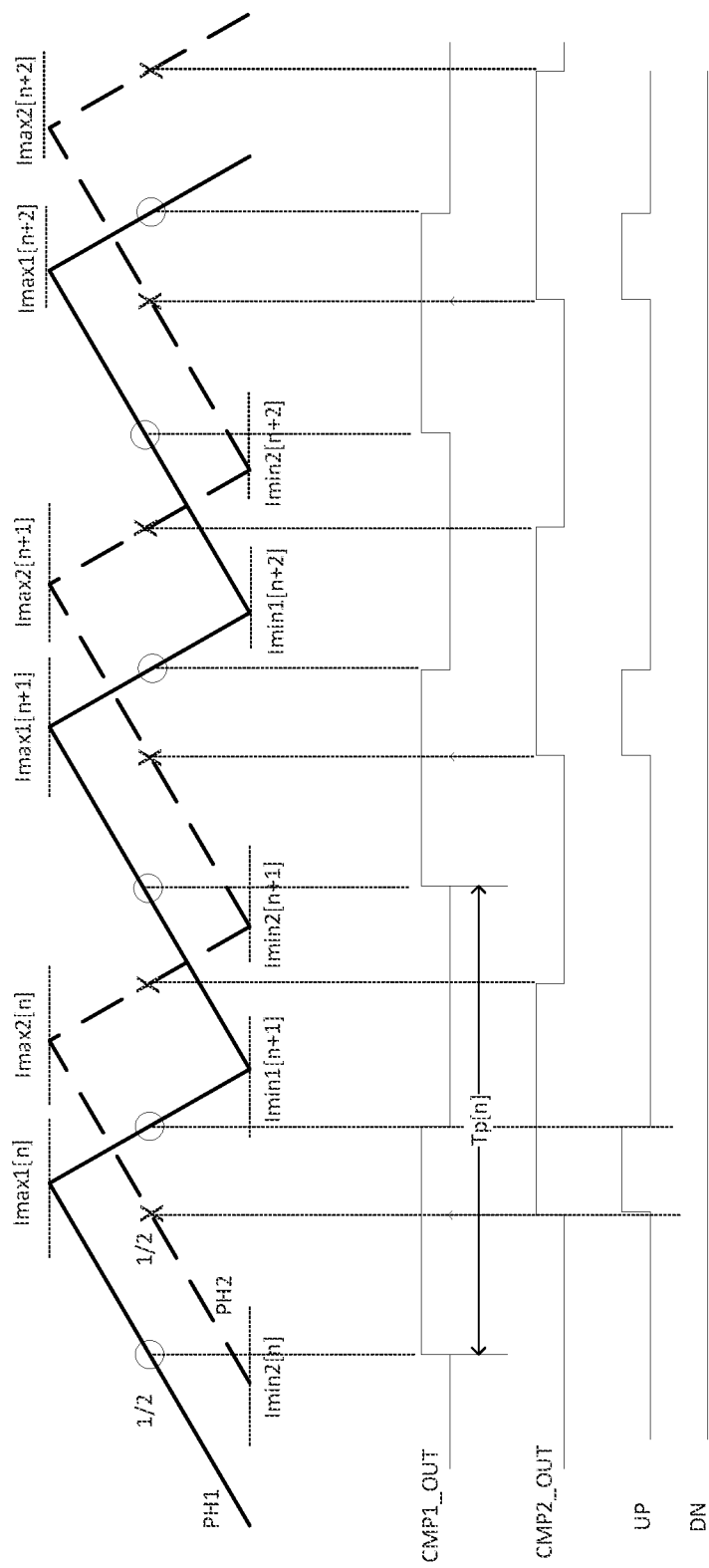
FIGS. 3 through 5 illustrate respective waveform diagrams associated with operating the multi-phase PFC system with two fast switching phases.

As shown in FIG. 3, the output CMP1_OUT of the first comparator 302 is activated when current phase signal PH1 which represents the first inductor current iL1 exceeds predetermined crossing point th1, where th1=|imax1[n]−imin1[n]|/2, 'n' represents the nth switching cycle, imax1 is the maximum current level for the first fast switching phase 104, and imin1 is the minimum current level for the first fast switching phase 104. Similarly, the output CMP2_OUT of the second comparator 304 is activated when current phase signal PH2 which represents the second inductor current iL2 exceeds predetermined crossing point th2, where th2=|imax2[n]−imin2[n]|/2, 'n' represents the nth switching cycle, imax2 is the maximum current level for the second fast switching phase 106, and imin2 is the minimum current level for the second fast switching phase 106. For the 2-phase example illustrated in FIG. 3, th1=th2=½ (i.e., the midpoint of the current phase slopes).

The switching period Tp of the fast switching phases 104, 106 changes under the variable frequency control implemented by the variable frequency control loop 122 of the controller 120. A period measurement block 306 of the phase correction circuit 124 measures the switching period Tp[n] of each switching cycle (FIG. 2, Block 202). A phase measurement block 308 of the phase correction circuit 124 measures the phase shift between the fast switching phases 104, 106 (FIG. 2, Block 204), by measuring the width of the phase synchronization correction indicator components UP, DN activated by the phase detector 300.

The phase correction circuit 124 may include a phase limiter block 310 that limits the maximum amount of permitted phase misalignment correction, and a phase measurement block 312 that defines the phase shift that is to be compensated. The phase error 'phase_error_measured' measured by the phase measurement block 312 is normalized to the applied delta current |imax[n]−imin[n]| by a multiplier 314 (FIG. 2, Block 206), and then divided 316 by the computed switching period Tp[n] to extract the required phase correction 'Icorrection' to be applied in the next switching cycle [n+1] for compensating the phase misalignment (FIG. 2, Block 208).

FIG. 3 shows the first and second fast switching phases 104, 106 interleaved but not synchronized. Ideally, the predetermined crossing point (midpoint for the 2-phase example) along the rising slope of the generated second current phase signal PH2 should intersect the same predetermined crossing point along the falling slope of the generated first current phase signal PH1 for the phases 104, 106 to be considered perfectly synchronized. The predetermined crossing point along the rising slope of the generated second current phase signal PH2 is indicated by an 'X' in FIG. 3 for each switching period Tp and corresponds to the midpoint in the 2-phase example, whereas the same predetermined crossing point along the falling slope of the generated first current phase signal PH1 is indicated by an 'O'. Since the midpoint '½' of the rising slope of PH2 does not intersect the midpoint of the falling slope of PH1, as indicated by the misalignment of the 'Xs' and the 'Os' in FIG. 3, the fast switching phases 104, 106 are considered to be out of synchronization.

The out-of-sync state is indicated when the phase measurement block 308 of the phase correction circuit 124 activates component UP of the phase synchronization correction indicator, where the width of the signal component UP corresponds to the degree of overlap between the comparator outputs CMP1_OUT, CMP2_OUT and indicates the magnitude of the phase shift to be corrected. If, conversely, the midpoint of the rising slope of PH2 follows the midpoint of the falling slope of PH1 as shown in FIG. 4, the first and second fast switching phases 104, 106 are again considered to be out of synchronization but the phase measurement block 308 instead activates component DN of the phase synchronization correction indicator to indicate phase misalignment in the opposite direction.

In either case, the controller 120 activates a phase synchronization correction indicator (UP or DN component) if the predetermined crossing point 'X' along a rising or falling slope of the current PH2 delivered by the second fast switching phase 106 is misaligned with the same predetermined crossing point 'O' along the opposite slope of the current PH1 delivered by the first fast switching phase 104.

During the next switching cycle [n+1], the controller 120 adjusts the switching period Tp[n+1] of the second phase 106 if the phase synchronization correction indicator (UP or DN) was activated during the previous switching cycle [n]. For example, in FIG. 4, phase synchronization correction indicator UP was activated during switching cycle [n] to indicate that the predetermined crossing point 'X' (midpoint for the 2-phase example) along the rising slope of PH2 precedes (leads) the same predetermined crossing point 'O' along the falling slope of PH1 and therefore the first and second fast switching phases 104, 106 are out of synchronization.

Figure 4:
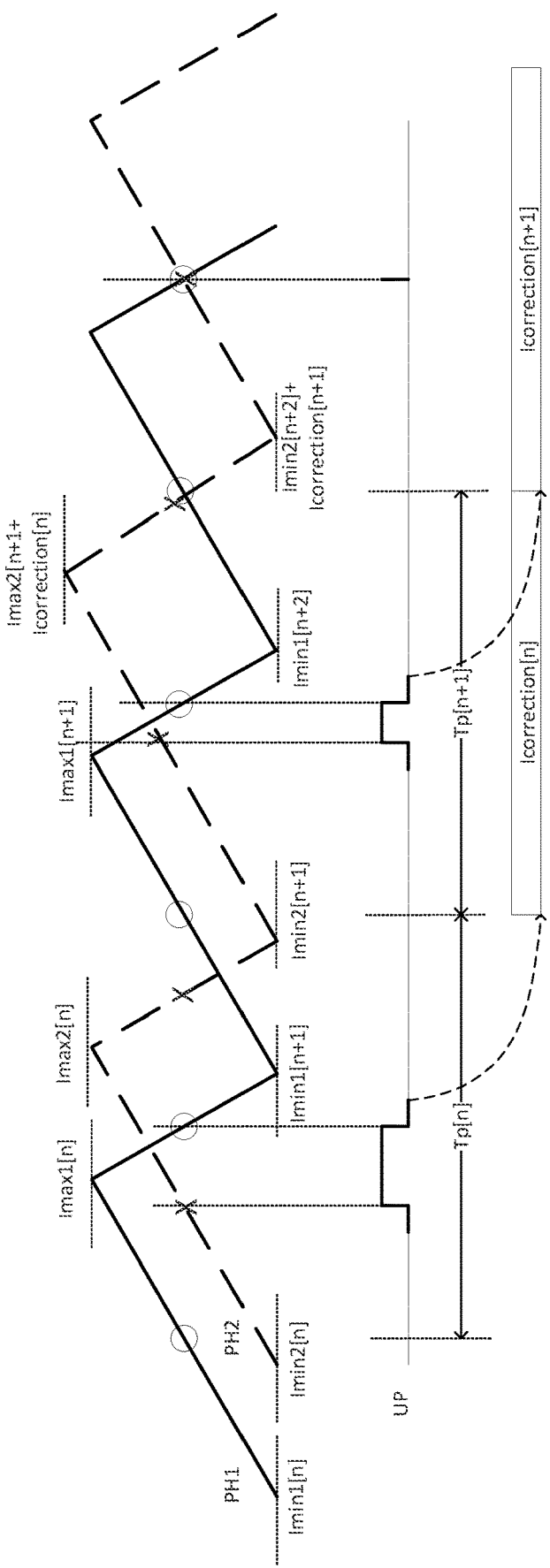

As shown in FIG. 4, the phase correction term Icorrection, which has a magnitude corresponding to the width of phase synchronization correction indicator UP activated during switching cycle [n], is applied to the second fast switching phase 106 during the next switching cycle [n+1]. Accordingly, the switching period Tp[n+1] of the second fast switching phase 106 increases and the second fast switching phase 106 remains on for a longer duration for switching cycle [n+1] than for switching cycle [n], which begins to correct for the phase shift misalignment. The on time of the second fast switching phase 106 may be increased each subsequent switching cycle, unless limited by the phase limiter 310, until the first and second fast switching phases 104, 106 are brought into phase alignment, e.g., as indicated by the very small width of the phase synchronization correction indicator UP activated during switching cycle [n+2] in FIG. 4.

Figure 5:
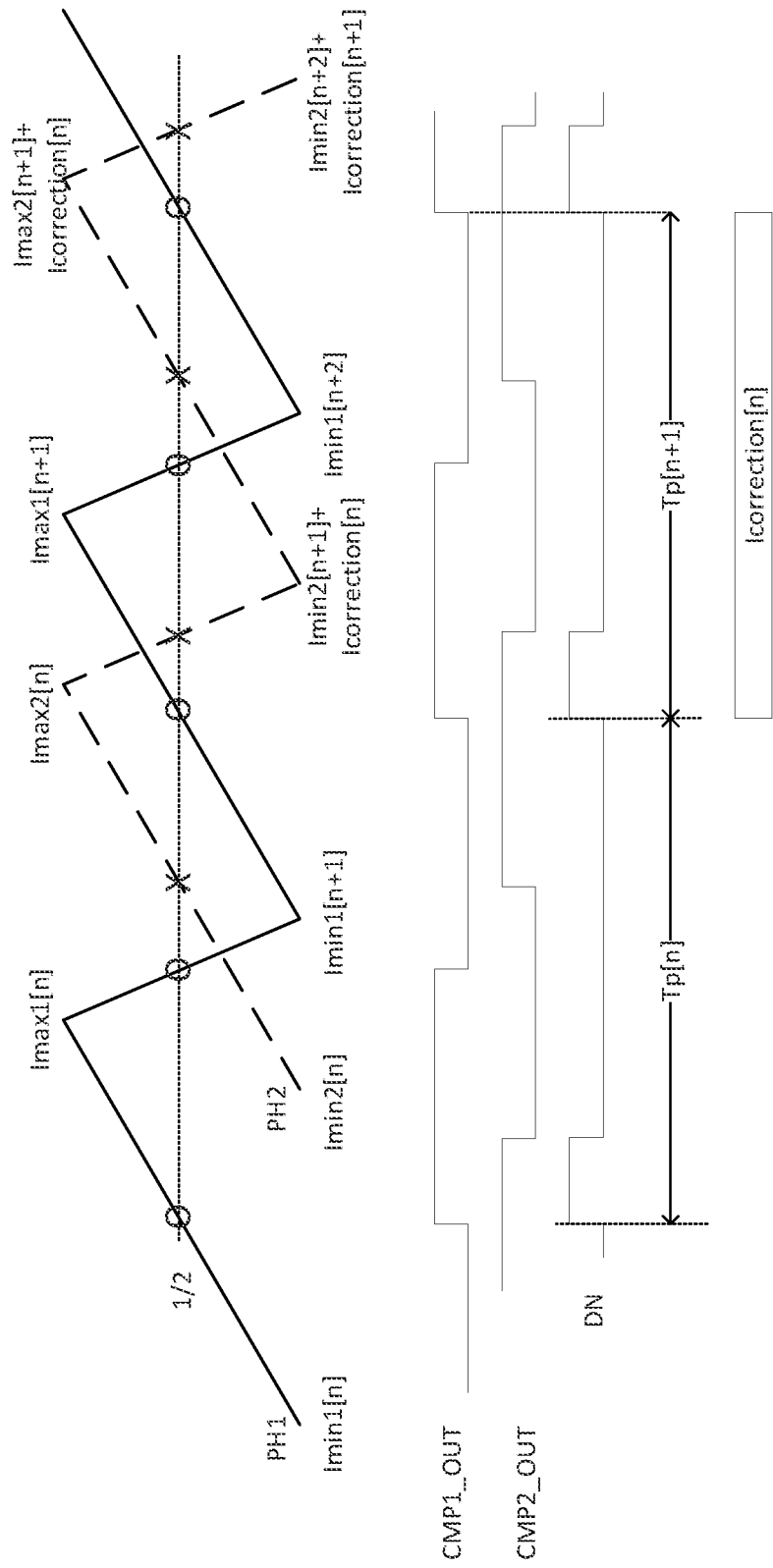

FIG. 5 illustrates the same phase synchronization correction process, but in the opposite direction. In this case, the predetermined crossing point 'X' (midpoint for the 2-phase example) along the rising slope of PH2 follows (lags) the same predetermined crossing point 'O' along the falling slope of PH1 during switching cycle [n] and the controller 120 activates the corresponding phase synchronization correction indicator DN. During the next switching cycle [n+1], the controller 120 decreases the switching period Tp[n+1] of the second phase 106 based on the width of phase synchronization correction indicator DN activated during switching cycle [n]. Accordingly, the second fast switching phase 106 is on for a shorter duration for switching cycle [n+1] than for switching cycle [n], which begins to correct the phase shift misalignment. The on time of the second fast switching phase 106 may be reduced each subsequent switching cycle, unless limited by the phase limiter 310, until the first and second fast switching phases 104, 106 are brought into phase alignment.

Operation of the PFC system 100 was explained above with reference to FIGS. 2 through 6 in the context of two fast switching phases 104, 106. However, the phase misalignment correction technique described herein apply to a PFC system 100 that has more than two fast switching phases 104, 106.

Figure 7:
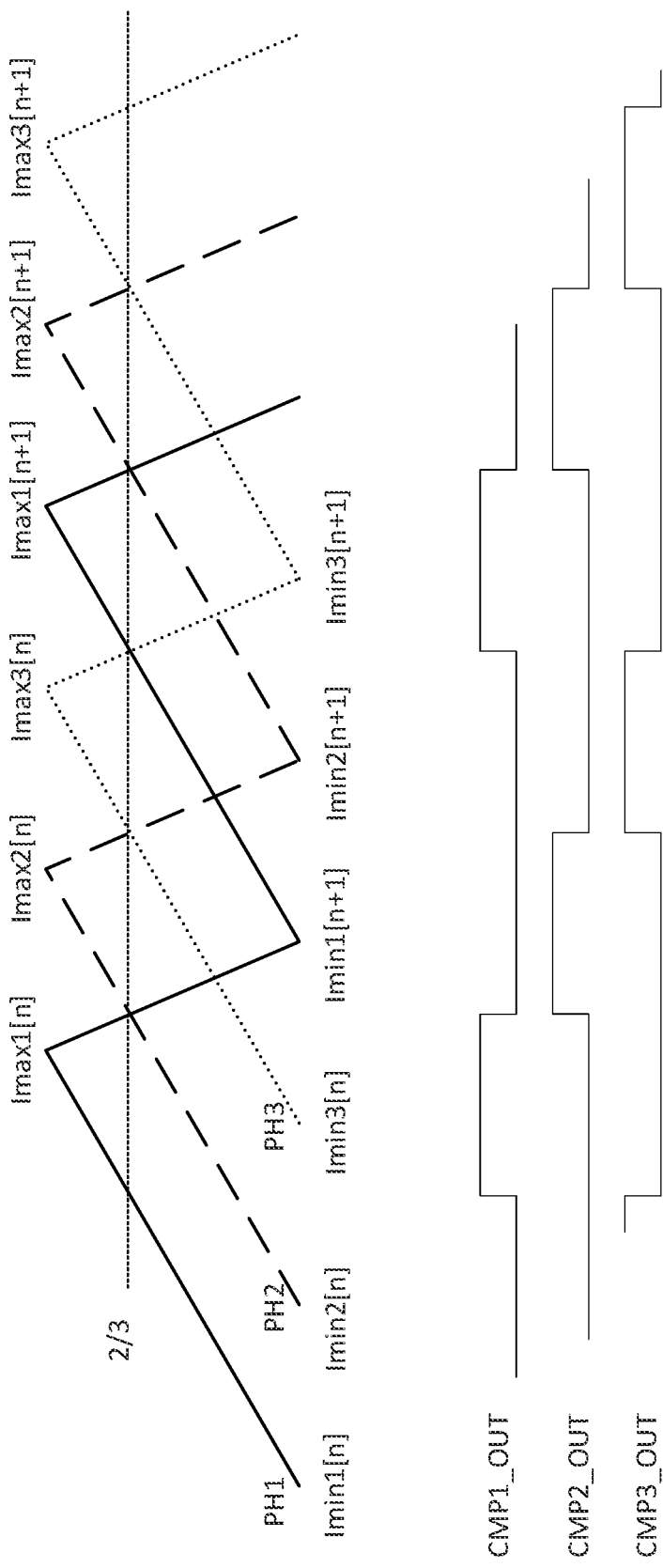
FIG. 7 illustrates waveform diagrams associated with operating the multi-phase PFC system with three fast switching phases.

FIG. 7 illustrates the phase misalignment correction technique expanded to three fast switching current phases PH1, PH2, PH3. In the 2-phase example described above, the first fast switching current phase PH1 was used as the master and the second fast switching current phase PH2 as a slave. The first fast switching current phase PH1 again serves as the master in the 3-phase example illustrated in FIG. 7, with the other two fast switching current phases PH2, PH3 serving as slaves. However, any one of the fast switching current phases PH1, PH2, PH3 may designated as the master (i.e., reference phase).

In FIG. 7, the predetermined crossing point used to determine the presence of phase misalignment is ⅔ since there are three fast switching current phases PH1, PH2, PH3 under consideration. In the 2-phase example, the predetermined crossing point was the midpoint (½) of each current phase slope since two fast switching current phases PH1, PH2 were considered.

The phase correction circuit 124 of the controller 120 provides a comparator output CMPn_OUT for each of the three fast switching current phases PH1, PH2, PH3. In FIG. 7, the fast switching current phases PH1, PH2, PH3 are in synchronization. That is, the ⅔ crossing point along the rising slope of PH2 is aligned with (intersects) the ⅔ crossing point along the falling slope of PH1 and the ⅔ crossing point along the falling slope of PH3 is aligned with (intersects) the ⅔ crossing point along the rising slope of PH1 during each switching cycle. Accordingly, there is no overlap between CMP1_OUT and either CMP2_OUT or CMP3_OUT which means that the controller 120 does not activate either component UP or component DN of the phase synchronization correction indicator for either the second fast switching current phase PH2 or the third fast switching current phase PH3. If either the second fast switching current phase PH2 or the third fast switching current phase PH3 precedes or follows the first fast switching current phase PH1 during any switching cycle [n], the controller 120 would take the corrective action shown in either FIG. 4 for a phase that is too early or in FIG. 5 for a phase that is too late in the next switching cycle [n+1].

The phase misalignment correction technique may be generalized to any PFC system 100 having two or more interleaved fast switching phases as follows. For N phases of a PFC system 100 operated under variable frequency control and to interleave the current delivered by the N phases to the load, where N is a positive integer greater than or equal to 2, one of the N phases is designated as a master (reference) phase and N−1 phases as slave phases. The controller 120 sets the predetermined crossing point for detecting phase misalignment equal to (N−n))/N or n/N, where n corresponds to the slave phase number. For two fast switching phases, the predetermined crossing point always is ½ (midpoint). For three fast switching phases, the predetermined crossing point can be ⅔ or ⅓. For four fast switching phases, the predetermined crossing point can be ¾ or ¼, and so on.

The phase misalignment correction technique described herein provides an effective method to synchronize and maintain interleaved current phases in a totem pole PFC system operating in multi-mode and controlled in hysteretic control mode, providing a control system even in the case of complex control method like the totem pole interleaved PFC system operating in variable frequency. The phase misalignment correction technique includes detecting, adjusting, and maintaining synchronized out-of-phase two (or more) current phases in a totem pole Interleaved PFC system controlled in sliding current mode (or hysteretic) and operating with variable frequency. A measured phase shift is used to determine a parameter to increase or decrease the ramp requested to compensate for the signal phase shift.

Although the present disclosure is not so limited, the following numbered examples demonstrate one or more aspects of the disclosure.

Example 1. A method for controlling a PFC (power factor correction) system having a plurality of phases, the method comprising: operating the plurality of phases under variable frequency control to interleave current delivered by the plurality of phases to a load; during a switching cycle for the plurality of phases, activating a phase synchronization correction indicator if a predetermined crossing point along a rising or falling slope of the current delivered by a second phase of the plurality of phases is misaligned with the same predetermined crossing point along the opposite slope of the current delivered by a first phase of the plurality of phases; and during the next switching cycle, adjusting a switching period of the second phase if the phase synchronization correction indicator was activated during the previous switching cycle.

Example 2. The method of example 1, wherein generating the phase synchronization correction indicator comprises: during the switching cycle, activating the phase synchronization correction indicator if the predetermined crossing point along the rising slope of the current delivered by the second phase precedes the same predetermined crossing point along the falling slope of the current delivered by the first phase.

Example 3. The method of example 2, wherein adjusting the switching period of the second phase comprises: during the next switching cycle, increasing the switching period of the second phase if the phase synchronization correction indicator was activated during the previous switching cycle.

Example 4. The method of example 1, wherein generating the phase synchronization correction indicator comprises: during the switching cycle, activating the phase synchronization correction indicator if the predetermined crossing point along the falling slope of the current delivered by the second phase follows the same predetermined crossing point along the rising slope of the current delivered by the first phase.

Example 5. The method of example 4, wherein adjusting the switching period of the second phase comprises: during the next switching cycle, decreasing the switching period of the second phase if the phase synchronization correction indicator was activated during the previous switching cycle.

Example 6. The method of example 1, wherein generating the phase synchronization correction indicator comprises: during the switching cycle, activating a first crossing point signal when the current delivered by the first phase is above the predetermined threshold value and activating a second crossing point signal when the current delivered by the second phase is above the predetermined threshold value; and during the same switching cycle, activating a first component of the phase synchronization correction indicator if the first and second crossing point signals overlap and the second crossing point signal becomes active when the first crossing point signal is already active and activating a second component of the phase synchronization correction indicator if the first and second crossing point signals overlap and the first crossing point signal becomes active when second first crossing point signal is already active.

Example 7. The method of example 6, wherein adjusting the switching period of the second phase comprises: during the next switching cycle, increasing the switching period of the second phase if the first component of the phase synchronization correction indicator was activated during the previous switching cycle and decreasing the switching period of the second phase if the second component of the phase synchronization correction indicator was activated during the previous switching cycle.

Example 8. The method of any of examples 1 through 7, wherein N phases of the PFC system are operated under variable frequency control to interleave the current delivered by the N phases to the load, wherein N is a positive integer greater than or equal to 2, wherein one of the N phases is a master phase and N−1 phases are slave phases, wherein the predetermined crossing point equals (N−n))/N or n/N, and wherein n corresponds to the slave phase number.

Example 9. A controller for a PFC (power factor correction) system having a plurality of phases, the controller comprising: a variable frequency control loop configured to operate the plurality of phases under variable frequency control to interleave current delivered by the plurality of phases to a load; and a phase correction circuit configured to: during a switching cycle for the plurality of phases, activate a phase synchronization correction indicator if a predetermined crossing point along a rising or falling slope of the current delivered by a second phase of the plurality of phases is misaligned with the same predetermined crossing point along the opposite slope of the current delivered by a first phase of the plurality of phases; and during the next switching cycle, adjust a switching period of the second phase if the phase synchronization correction indicator was activated during the previous switching cycle.

Example 10. The controller of example 9, wherein during the switching cycle, the phase correction circuit is configured to activate the phase synchronization correction indicator if the predetermined crossing point along the rising slope of the current delivered by the second phase precedes the same predetermined crossing point along the falling slope of the current delivered by the first phase.

Example 11. The controller of example 10, wherein during the next switching cycle, the phase correction circuit is configured to increase the switching period of the second phase if the phase synchronization correction indicator was activated during the previous switching cycle.

Example 12. The controller of example 9, wherein during the switching cycle, the phase correction circuit is configured to activate the phase synchronization correction indicator if the predetermined crossing point along the falling slope of the current delivered by the second phase follows the same predetermined crossing point along the rising slope of the current delivered by the first phase.

Example 13. The controller of example 12, wherein during the next switching cycle, the phase correction circuit is configured to decrease the switching period of the second phase if the phase synchronization correction indicator was activated during the previous switching cycle.

Example 14. The controller of example 9, wherein during the switching cycle, the phase correction circuit is configured to: activate a first crossing point signal when the current delivered by the first phase is above the predetermined threshold value; activate a second crossing point signal when the current delivered by the second phase is above the predetermined threshold value; activate a first component of the phase synchronization correction indicator if the first and second crossing point signals overlap and the second crossing point signal becomes active when the first crossing point signal is already active; and activate a second component of the phase synchronization correction indicator if the first and second crossing point signals overlap and the first crossing point signal becomes active when second first crossing point signal is already active.

Example 15. The controller of example 14, wherein during the next switching cycle, the phase correction circuit is configured to: increase the switching period of the second phase if the first component of the phase synchronization correction indicator was activated during the previous switching cycle; and decrease the switching period of the second phase if the second component of the phase synchronization correction indicator was activated during the previous switching cycle.

Example 16. The controller of any of examples 9 through 15, wherein the variable frequency control loop is configured to operate N phases of the PFC system under variable frequency control to interleave the current delivered by the N phases to the load, wherein N is a positive integer greater than or equal to 2, wherein one of the N phases is a master phase and N−1 phases are slave phases, wherein the predetermined crossing point equals (N−n))/N or n/N, and wherein n corresponds to the slave phase number.

Example 17. A PFC (power factor correction) system, comprising: a plurality of phases; and a controller configured to: operate the plurality of phases under variable frequency control to interleave current delivered by the plurality of phases to a load; during a switching cycle for the plurality of phases, activate a phase synchronization correction indicator if a predetermined crossing point along a rising or falling slope of the current delivered by a second phase of the plurality of phases is misaligned with the same predetermined crossing point along the opposite slope of the current delivered by a first phase of the plurality of phases; and during the next switching cycle, adjust a switching period of the second phase if the phase synchronization correction indicator was activated during the previous switching cycle.

Example 18. The PFC system of example 17, wherein during the switching cycle, the controller is configured to: activate a first crossing point signal when the current delivered by the first phase is above the predetermined threshold value; activate a second crossing point signal when the current delivered by the second phase is above the predetermined threshold value; activate a first component of the phase synchronization correction indicator if the first and second crossing point signals overlap and the second crossing point signal becomes active when the first crossing point signal is already active; and activate a second component of the phase synchronization correction indicator if the first and second crossing point signals overlap and the first crossing point signal becomes active when second first crossing point signal is already active.

Example 19. The PFC system of example 18, wherein during the next switching cycle, the controller is configured to: increase the switching period of the second phase if the first component of the phase synchronization correction indicator was activated during the previous switching cycle; and decrease the switching period of the second phase if the second component of the phase synchronization correction indicator was activated during the previous switching cycle.

Example 20. The PFC system of any of examples 17 through 19, wherein the PFC system has N phases configured to be operated under variable frequency control by the controller to interleave the current delivered by the N phases to the load, wherein N is a positive integer greater than or equal to 2, wherein one of the N phases is a master phase and N−1 phases are slave phases, wherein the predetermined crossing point equals (N−n))/N or n/N, and wherein n corresponds to the slave phase number.

Terms such as "first", "second", and the like, are used to describe various elements, regions, sections, etc. and are also not intended to be limiting. Like terms refer to like elements throughout the description.

As used herein, the terms "having", "containing", "including", "comprising" and the like are open ended terms that indicate the presence of stated elements or features, but do not preclude additional elements or features. The articles "a", "an" and "the" are intended to include the plural as well as the singular, unless the context clearly indicates otherwise.

The expression "and/or" should be interpreted to include all possible conjunctive and disjunctive combinations, unless expressly noted otherwise. For example, the expression "A and/or B" should be interpreted to mean only A, only B, or both A and B. The expression "at least one of" should be interpreted in the same manner as "and/or", unless expressly noted otherwise. For example, the expression "at least one of A and B" should be interpreted to mean only A, only B, or both A and B.

It is to be understood that the features of the various embodiments described herein may be combined with each other, unless specifically noted otherwise.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A method for controlling a PFC (power factor correction) system having a plurality of phases, the method comprising:
    operating the plurality of phases under variable frequency control to interleave current delivered by the plurality of phases to a load;
    during a switching cycle for the plurality of phases, activating a phase synchronization correction indicator if a predetermined crossing point along a rising or falling slope of the current delivered by a second phase of the plurality of phases is misaligned with the same predetermined crossing point along the opposite slope of the current delivered by a first phase of the plurality of phases; and
    during the next switching cycle, adjusting a switching period of the second phase if the phase synchronization correction indicator was activated during the previous switching cycle.

2. The method of claim 1, wherein generating the phase synchronization correction indicator comprises:
    during the switching cycle, activating the phase synchronization correction indicator if the predetermined crossing point along the rising slope of the current delivered by the second phase precedes the same predetermined crossing point along the falling slope of the current delivered by the first phase.

3. The method of claim 2, wherein adjusting the switching period of the second phase comprises:
    during the next switching cycle, increasing the switching period of the second phase if the phase synchronization correction indicator was activated during the previous switching cycle.

4. The method of claim 1, wherein generating the phase synchronization correction indicator comprises:
    during the switching cycle, activating the phase synchronization correction indicator if the predetermined crossing point along the falling slope of the current delivered by the second phase follows the same predetermined crossing point along the rising slope of the current delivered by the first phase.

5. The method of claim 4, wherein adjusting the switching period of the second phase comprises:
    during the next switching cycle, decreasing the switching period of the second phase if the phase synchronization correction indicator was activated during the previous switching cycle.

6. The method of claim 1, wherein generating the phase synchronization correction indicator comprises:
    during the switching cycle, activating a first crossing point signal when the current delivered by the first phase is above the predetermined threshold value and activating a second crossing point signal when the current delivered by the second phase is above the predetermined threshold value; and
    during the same switching cycle, activating a first component of the phase synchronization correction indicator if the first and second crossing point signals overlap and the second crossing point signal becomes active when the first crossing point signal is already active and activating a second component of the phase synchronization correction indicator if the first and second crossing point signals overlap and the first crossing point signal becomes active when second first crossing point signal is already active.

7. The method of claim 6, wherein adjusting the switching period of the second phase comprises:
    during the next switching cycle, increasing the switching period of the second phase if the first component of the phase synchronization correction indicator was activated during the previous switching cycle and decreasing the switching period of the second phase if the second component of the phase synchronization correction indicator was activated during the previous switching cycle.

8. The method of claim 1, wherein N phases of the PFC system are operated under variable frequency control to interleave the current delivered by the N phases to the load, wherein N is a positive integer greater than or equal to 2, wherein one of the N phases is a master phase and N−1 phases are slave phases, wherein the predetermined crossing point equals (N−n))/N or n/N, and wherein n corresponds to the slave phase number.

9. A controller for a PFC (power factor correction) system having a plurality of phases, the controller comprising:
 a variable frequency control loop configured to operate the plurality of phases under variable frequency control to interleave current delivered by the plurality of phases to a load; and
 a phase correction circuit configured to:
  during a switching cycle for the plurality of phases, activate a phase synchronization correction indicator if a predetermined crossing point along a rising or falling slope of the current delivered by a second phase of the plurality of phases is misaligned with the same predetermined crossing point along the opposite slope of the current delivered by a first phase of the plurality of phases; and
  during the next switching cycle, adjust a switching period of the second phase if the phase synchronization correction indicator was activated during the previous switching cycle.

10. The controller of claim 9, wherein during the switching cycle, the phase correction circuit is configured to activate the phase synchronization correction indicator if the predetermined crossing point along the rising slope of the current delivered by the second phase precedes the same predetermined crossing point along the falling slope of the current delivered by the first phase.

11. The controller of claim 10, wherein during the next switching cycle, the phase correction circuit is configured to increase the switching period of the second phase if the phase synchronization correction indicator was activated during the previous switching cycle.

12. The controller of claim 9, wherein during the switching cycle, the phase correction circuit is configured to activate the phase synchronization correction indicator if the predetermined crossing point along the falling slope of the current delivered by the second phase follows the same predetermined crossing point along the rising slope of the current delivered by the first phase.

13. The controller of claim 12, wherein during the next switching cycle, the phase correction circuit is configured to decrease the switching period of the second phase if the phase synchronization correction indicator was activated during the previous switching cycle.

14. The controller of claim 9, wherein during the switching cycle, the phase correction circuit is configured to:
 activate a first crossing point signal when the current delivered by the first phase is above the predetermined threshold value;
 activate a second crossing point signal when the current delivered by the second phase is above the predetermined threshold value;
 activate a first component of the phase synchronization correction indicator if the first and second crossing point signals overlap and the second crossing point signal becomes active when the first crossing point signal is already active; and
 activate a second component of the phase synchronization correction indicator if the first and second crossing point signals overlap and the first crossing point signal becomes active when second first crossing point signal is already active.

15. The controller of claim 14, wherein during the next switching cycle, the phase correction circuit is configured to:
 increase the switching period of the second phase if the first component of the phase synchronization correction indicator was activated during the previous switching cycle; and
 decrease the switching period of the second phase if the second component of the phase synchronization correction indicator was activated during the previous switching cycle.

16. The controller of claim 9, wherein the variable frequency control loop is configured to operate N phases of the PFC system under variable frequency control to interleave the current delivered by the N phases to the load, wherein N is a positive integer greater than or equal to 2, wherein one of the N phases is a master phase and N−1 phases are slave phases, wherein the predetermined crossing point equals (N−n))/N or n/N, and wherein n corresponds to the slave phase number.

17. A PFC (power factor correction) system, comprising:
 a plurality of phases; and
 a controller configured to:
  operate the plurality of phases under variable frequency control to interleave current delivered by the plurality of phases to a load;
  during a switching cycle for the plurality of phases, activate a phase synchronization correction indicator if a predetermined crossing point along a rising or falling slope of the current delivered by a second phase of the plurality of phases is misaligned with the same predetermined crossing point along the opposite slope of the current delivered by a first phase of the plurality of phases; and
  during the next switching cycle, adjust a switching period of the second phase if the phase synchronization correction indicator was activated during the previous switching cycle.

18. The PFC system of claim 17, wherein during the switching cycle, the controller is configured to:
 activate a first crossing point signal when the current delivered by the first phase is above the predetermined threshold value;
 activate a second crossing point signal when the current delivered by the second phase is above the predetermined threshold value;
 activate a first component of the phase synchronization correction indicator if the first and second crossing point signals overlap and the second crossing point signal becomes active when the first crossing point signal is already active; and
 activate a second component of the phase synchronization correction indicator if the first and second crossing point signals overlap and the first crossing point signal becomes active when second first crossing point signal is already active.

19. The PFC system of claim 18, wherein during the next switching cycle, the controller is configured to:
 increase the switching period of the second phase if the first component of the phase synchronization correction indicator was activated during the previous switching cycle; and decrease the switching period of the second phase if the second component of the phase synchronization correction indicator was activated during the previous switching cycle.

20. The PFC system of claim 17, wherein the PFC system has N phases configured to be operated under variable frequency control by the controller to interleave the current delivered by the N phases to the load, wherein N is a positive integer greater than or equal to 2, wherein one of the N phases is a master phase and N−1 phases are slave phases, wherein the predetermined crossing point equals (N−n))/N or n/N, and wherein n corresponds to the slave phase number.

\* \* \* \* \*